United States Patent [19]

Leech

[11] Patent Number: 4,547,122
[45] Date of Patent: Oct. 15, 1985

[54] METHOD OF CONTAINING FRACTURED TURBINE BLADE FRAGMENTS

[75] Inventor: John W. Leech, Bethesda, Md.

[73] Assignee: Aeronautical Research Associates of Princeton, Inc., McLean, Va.

[21] Appl. No.: 541,937

[22] Filed: Oct. 14, 1983

[51] Int. Cl.⁴ .......................................... F01D 21/04
[52] U.S. Cl. ........................................ 415/9; 415/174
[58] Field of Search .................. 415/9, 196, 197, 174; 109/49.5, 78, 80, 84

[56] References Cited

U.S. PATENT DOCUMENTS

| | | | |
|---|---|---|---|
| 3,604,374 | 9/1971 | Matson | 109/49.5 X |
| 3,616,115 | 10/1971 | Klimmek | 109/84 X |
| 3,633,520 | 1/1972 | Stiglich | 109/49.5 X |
| 3,743,569 | 7/1973 | Wilkins et al. | 109/49.5 |
| 3,801,416 | 4/1974 | Gulbierz | 109/49.5 |
| 3,832,266 | 8/1974 | Archibald | 109/49.5 |
| 3,874,855 | 4/1975 | Legrand | 109/84 X |
| 4,057,359 | 11/1977 | Grooman | 415/9 |
| 4,149,824 | 4/1979 | Adamson | 415/197 X |
| 4,199,300 | 4/1980 | Tubbs | 415/9 |
| 4,323,000 | 4/1982 | Dennis et al. | 109/84 X |
| 4,377,370 | 3/1983 | Porcelli | 415/9 |

FOREIGN PATENT DOCUMENTS 1004855 2/1973 Italy .

OTHER PUBLICATIONS

Gardner, "Ceramic Composite Protection for Turbine Disc Burets", MIT Workshop Mar. 29-31, 1977.

Primary Examiner—Robert E. Garrett
Assistant Examiner—Joseph M. Pitko
Attorney, Agent, or Firm—David H. Semmes; Warren E. Olsen

[57] ABSTRACT

Method of containing fractured turbine engine components, for example rotor and blade fragments within turbine engine casings, comprising diffusing and impeding motion of the fractured blade fragment by encircling the turbine engine with an honeycomb structure; shielding the honeycomb with an outer shell which has a high bending stiffness and which encloses a series of subdivided compartments in juxtaposition with the honeycomb; and absorbing energy of the fractured blade fragments by supporting a series of ceramic blocks within the confined compartments adjacent said honeycomb. A suggested ceramic for use in the blocks is a hot-pressed silicon carbide. The method is distinguished from the prior art in its ability to sustain the subsonic velocities.

3 Claims, 14 Drawing Figures

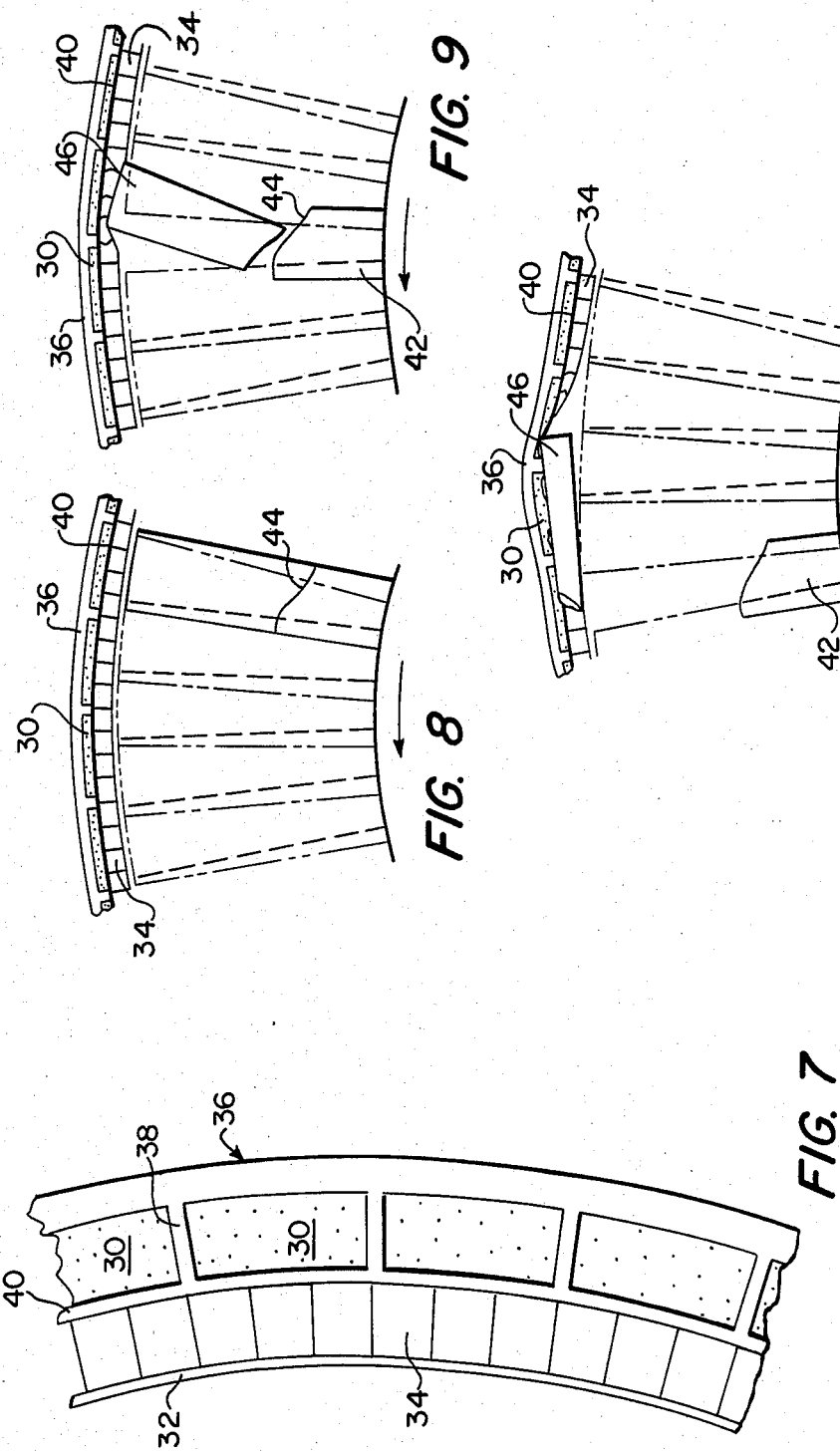

METHOD OF CONTAINING FRACTURED TURBINE BLADE FRAGMENTS

BACKGROUND OF THE INVENTION (1) Field of the Invention

Protective casings for rotational devices, for example, turbine engine casings; more particularly a method for containing fractured blade fragments within turbine engine casings. The method is characterized by its ability to diffuse and impede the motion of the blade fragment projectile, its ability to absorb the energy of the fractured blade fragment and by its high resistance to projectile penetration.

2. Description of the Prior Art

I. CERAMIC ARMOR: MATSON, U.S. Pat. No. 3,604,374 STIGLICH, Jr., U.S. Pat. No. 3,633,520 WILKENS, et al., U.S. Pat. No. 3,743,569 GULBIERZ, U.S. Pat. No. 3,801,416 ARCHIBALD, U.S. Pat. No. 3,832,266

II. CONTAINMENT RINGS FOR GAS TURBINE ENGINES: TUBBS, U.S. Pat. No. 4,199,300 GROOMAN, U.S. Pat. No. 4,057,359 GARDENER et al., U.S. Pat. No. 329,046 (Appeal No. 202-01) Abandoned.

The foregoing references are discussed in an accompanying Prior Art Statement.

SUMMARY OF THE INVENTION

According to the present invention, fractured blade fragments are contained by diffusing and impeding motion of the fragments within an encircling structure; by shielding the encircling structure with an outer shell which has a high bending stiffness and which integral webs defines with integral webs a series of confined compartments; and by absorbing energy of the fractured blade fragments within a series of ceramic blocks supported within the confined compartments. A hot-pressed ceramic such as silicon carbide is suggested as a ceramic block. The outer shell and webs may be manufactured from a metal having a high bending stiffness as well as resistance to projectile penetration. The method of particularly adapted to absorbing the kinetic energy of the subsonic velocities of turbine energy blade fragments.

DESCRIPTION OF THE DRAWINGS

FIG. 7 is an enlarged fragmentary section of the containment device, illustrated in FIG. 6.

FIG. 8 is a fragmentary transverse section, showing the rotation of the turbine engine blade with respect to the containment device.

FIG. 9 is a fragmentary transverse section, showing the broken blade tip engaging the honeycomb.

FIG. 10 is a fragmentary transverse section, showing the broken blade tip being driven into the containment device by impacts of the following blades.

DESCRIPTION OF THE PREFERRED EMBODIMENTS

Figure 1:
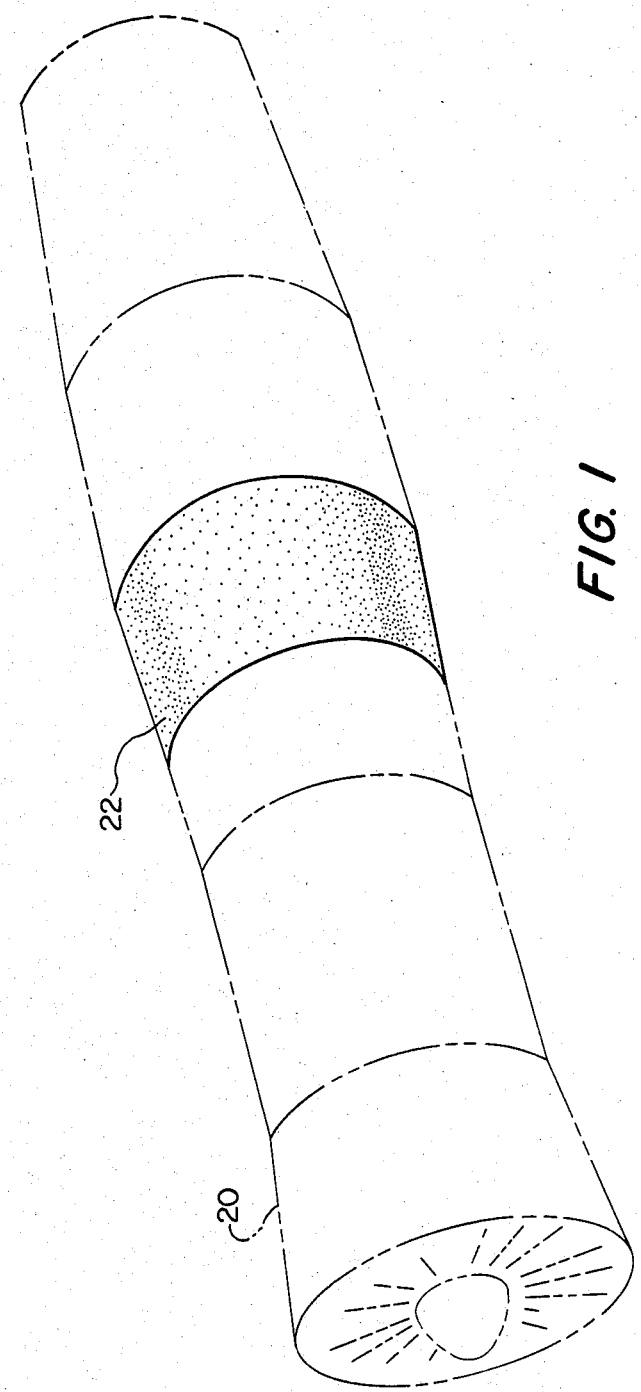
FIG. 1 is a perspective view, partially in phantom, showing a containment device supported within the turbine section of a typical jet engine case.

In FIG. 1 containment ring 22 is shown as incorporated within the turbine section of a typical jet engine case 20.

Figure 4:
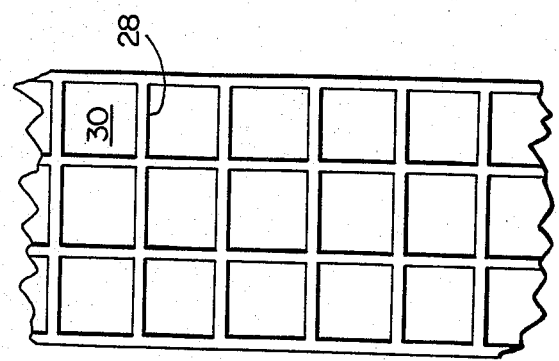
FIG. 4 is a fragmentary top plan of the cell compartments prior to securing of the outer shell plate, so as to confine a series of ceramic blocks within the compartments.
Figure 2:
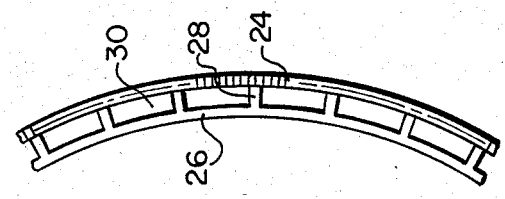
FIG. 2 is a fragmentary transverse section, showing an engine containment as an internal applique upon an existing engine case.

In FIG. 2 there is illustrated an internal applique of a containment layer or ring 26 which portrays web members 28 with respect to the existing engine case 24. Web 28, as illustrated in FIG. 4, confines ceramic tiles or blocks 30 in a series of sub-divided compartments.

Figure 3:
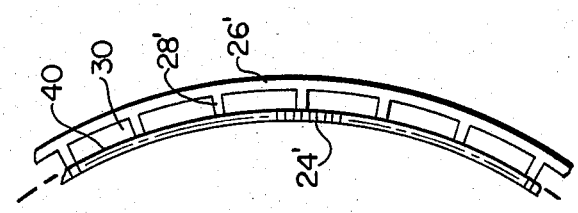
FIG. 3 is a fragmentary transverse section showing an external applique of a containment device upon an engine case.

In FIG. 3, an alternate arrangement is illustrated wherein the containment layer 26' is externally applied upon the existing engine case 24'.

Figure 6:
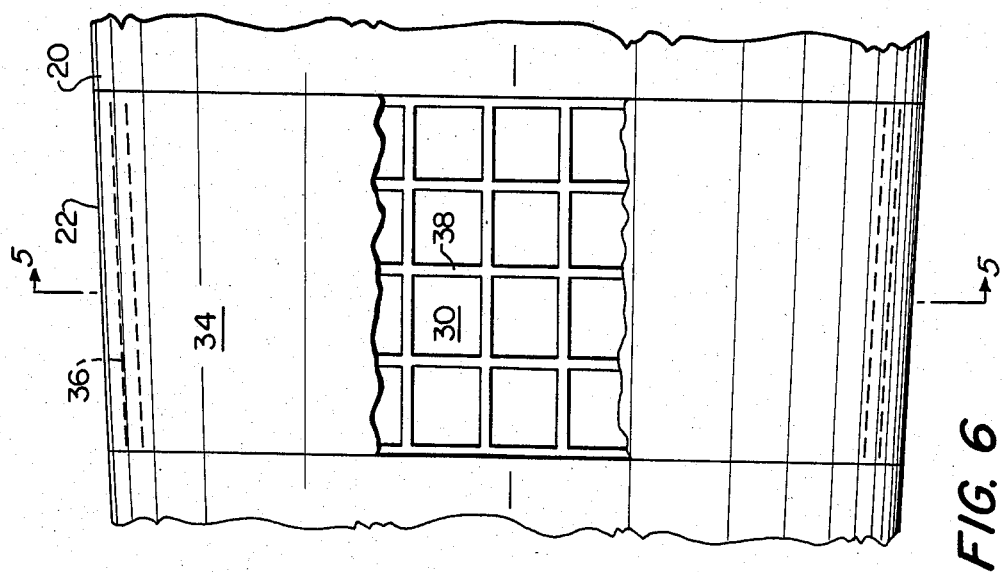
FIG. 6 is a fragmentary side elevation, partially in section, showing the containment device of FIG. 5 positioned within the case.
Figure 5:
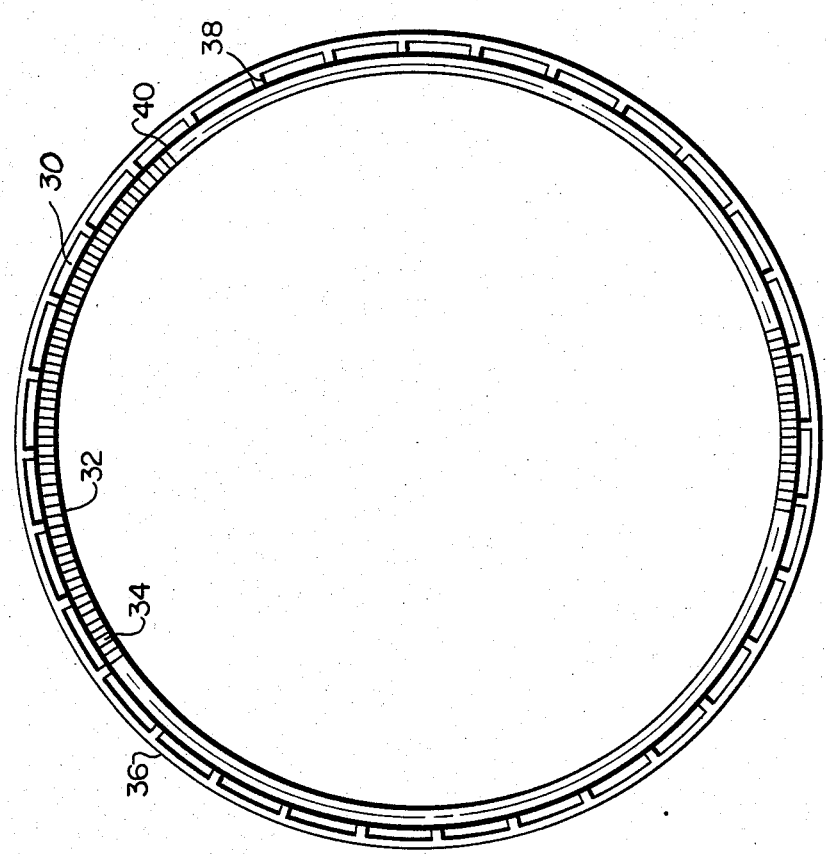
FIG. 5 is a transverse section of a containment device manufactured according to the present method wherein an outer shell defines an intermediate web which encloses a series of ceramic blocks, adjacent an inner honeycomb shell.

In FIG. 5 there is illustrated a preferred and composite containment ring including innerskin 32 which supports honeycomb shell 34 in juxtaposition with outer structural shell 36 having web members 38 which define subdivided compartments, enclosing ceramic tiles or bricks 30. This construction is illustrated in FIG. 6.

In FIG. 7 the containment ring is illustrated as including an intermediate structural layer or shell 40 which isolates ceramic bricks 30 with respect to honeycomb 34, an inner web 38 which defines a series of compartments containing ceramic blocks 30, and an outer shield 36 in the form of a shell. Shield 36 may be secured in place upon web 38 so as to confine ceramic blocks 30.

Containment ring construction is further illustrated in operation in FIGS. 8-13, wherein the turbine engine blade 42 mounted upon root 48 rotates in an arc adjacent the inner surface of the containment ring. As the blade 42 fractures as at 44, fragment 46 engages the honeycomb 34, as illustrated in FIG. 9. Radial orientation of blade fragment 46 begins to change drastically. In FIG. 10 the broken blade tip 46 is shown as driven into the containment ring structure by impact of the following blades.

Figure 11:
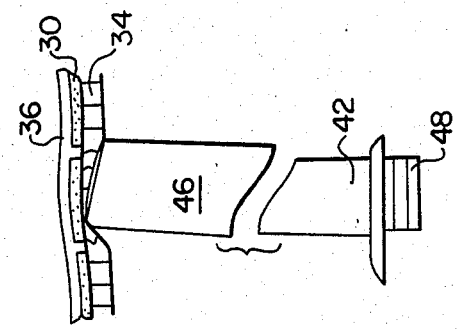
FIG. 11 is a longitudinal section, showing the broken blade tip with respect to a containment device.
Figure 12:
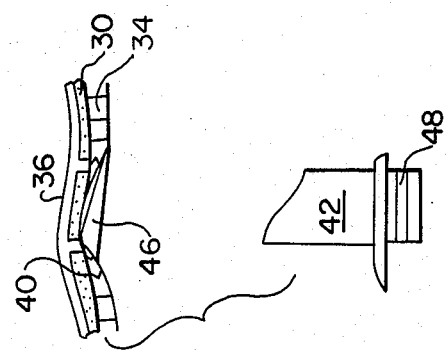
FIG. 12 is a fragmentary longitudinal section, showing the broken blade tip engaging the honeycomb.
Figure 13:
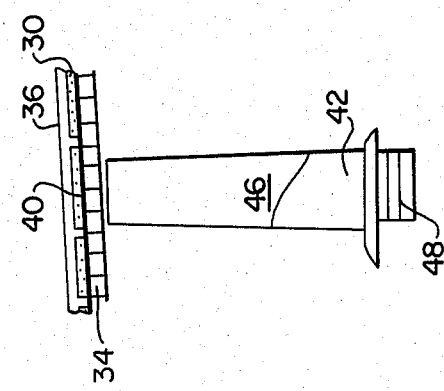
FIG. 13 is a fragmentary longitudinal section, showing the broken blade tip being driven into the containment ring by impact of the following blades.

FIGS. 11-13 are longitudinal or tangential views of the containment method, illustrated in FIGS. 8-10.

As will be apparent, the illustrated containment devices can be made of relatively lightweight material. An essential feature of the containment structure is that the ceramic is constrained, i.e. held in place front and back by metallic web 38 and shield 36 such that the ceramic cannot be displaced by the impinging blade or blade fragment.

Various structural materials, such as metal, metal alloys, or metal matrix composites, may be employed for the outer layer of the containment device and various hard, brittle, low density materials, such as ceramics, glass ceramics, carbides or ceramic matrix composites may be employed as blocks 30, contained within the web compartments. The inner layers 40 and honeycomb matrices 34 may be fabricated from metal, or metal alloys, but no restriction with respect to material or structural geometry is anticipated. Ceramics are particularly suited for high temperature applications, such as gas turbine engines. The particular choice of ceramic, metal, metal alloys or glasses is determined by the particular application and design restraints, for example low weight and cost considerations.

A suggeted containment ring may be comprised as follows:

(1) Composition of ceramic. The ceramic to be used is hot-pressed silicon carbide (SiC). This material has a density of between 3.15 and 3.20 g/cm$^3$. In the particular version chosen for preliminary testing, the silicon carbide is combined with 2 percent by weight of boron carbide (B$_4$C). Other properties are as listed by Ceradyne, Inc. for "Ceralloy" 146IG, as follows:

TABLE I

PROPERTIES OF "CERALLOY" HOT PRESSED CERAMICS

| "Ceralloy" 146 IG Silicon Carbide (SiC) (98%) Boron-Carbide (B$_4$C) (2%) | Property* (All measurements are made at room temperature) | |
|---|---|---|
| 3.20 3.15 | Density g/cm$^3$ | Theoretical "Ceralloy" Minimum |
| 60 to 70 | Modulus of Elasticity ($\times$ 10$^6$ psi) | |
| 65,000 min. | Modulus of Rupture psi | |
| 250,000 min. | Compressive Strength psi | |
| 4.5 $\times$ 10$^{-6}$/°C. (2.5 $\times$ 10$^{-6}$/°F.) | Coefficient of Linear Thermal Expansion Room Temperature to 1000° C. (1830° F.) | |
| 75 to 95 .31 to .39 | Thermal Conductivity | BTU · ft/(hr) (ft$^2$) (°F.) g-cal · cm/(sec) (cm$^2$) (°F.) |
| 10$^4$ | Electrical Resistivity (Volume) ohm-cm | |
| Same as 146A | Oxidation Resistant to | |
| 2450 to 2750 | Hardness, Knoop,. Kg/mm$^2$ | |
| 45,000 to 55,000 psi | Modulus of Rupture at 1200–1300° C. | |

*Values are typical and should not be considered as specifications.

(2) Outer shell. Outer shell 36 of the containment is a metal structure in the form of a cylinder, cone, or other suitable shape affixed to web 38. As such, shell 36 constitutes the main structural element of the containment in that it supports the other elements of the containment and, also, provides structural continuity with other portions of the engine case. The main containment function of the outer shell 36 is that it provides compartmental support for the ceramic layer tiles or blocks 30 during impact by blade fragments 46. This support is necessary to keep the ceramic in place, so that it may absorb the kinetic energy of blade fragments 46 to the greatest possible extent. Outer shell 36 provides flexural rigidity or bending stiffness, as a backup for the ceramic. As such, the outer shell is designed to contribute to the momentum absorbing capability of the entire containment structure.

(3) Containment/deflection device. The suggested containment/deflection device is a structure designed and located, so as to provide protection against damage which may be caused by broken parts of the rotating components of a jet engine. In the configuration illustrated in FIGS. 2 and 3, the device may constitute a portion of the engine case. The containment structure may be located at any point along the length of the case where there is the possibility that failure of a rotating component of the engine may result in the high speed ejection in any direction of a blade fragment, rotor fragment, etc. which, if not intercepted, might cause damage to structure, devices or personnel external to the engine proper. This interception may be accomplished either by containment of the fragment within the engine case, deflection of the fragment into a path away from adjacent structures, or both.

In another configuration, as illustrated in FIGS. 5–7 and 14, the containment/deflection device may constitute a portion of a structure adjacent to the engine, in which case, protection is afforded by shielding against impact by fragments which are not otherwise contained within the engine.

(4) Characteristics of outer shell. The outer shell design must take into account a balance among several factors:

Weight—The shell must be light enough so that when combined with the other elements of the containment, the total weight does not exceed that allowable for the particular portion of the engine case.

Dimensions—Diameter and thickness must be appropriate to take into account any limitations comprised by both interior and exterior structures. Length must be sufficient to provide an adequate zone of protection in an axial direction.

Stiffness—The outer shell must be designed with bending stiffness or flexural rigidity which is to support and enable the ceramic layer to function as an energy absorber.

(5) Web. Web 38 subdivides the ceramic layer into small compartments within which damage can be confined. The web, also, provides a structural link between the outer shell and the inner shell.

Function of Layers

In a typical three-layer structure, as illustrated FIGS. 5–13, the first layer or honeycomb diffuses the load imparted by the projectile and impedes the motion of the projectile through the remaining layers.

The second layer absorbs the energy of the fractured blade fragments within the ceramic blocks. This layer provides a hard target to the projectile to blunt and, perhaps, further fracture the projectile and further diffuse the load caused by the projectile.

The third layer provides the critical function of bending stiffness as a support for the second layer and provides, also, high resistance to projectile penetration.

Figure 14:
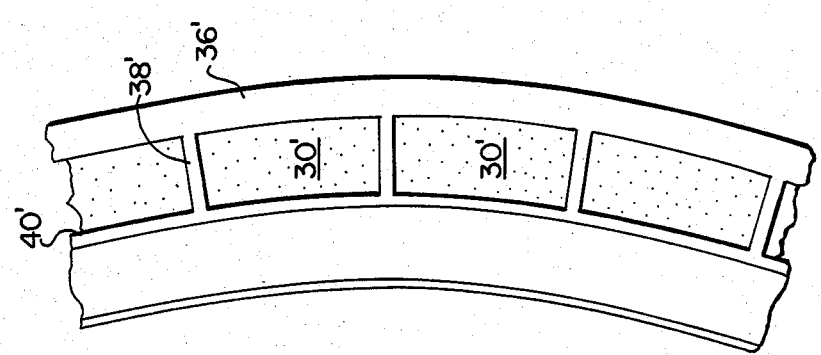
FIG. 14 is an enlarged fragmentary section of a modified device which eliminates the honeycomb.

In the modified structure, illustrated in FIG. 14, inner shell 40', web 38' and ceramic blocks 30' perform the function of the first and second layers.

Manifestly, variations may be made in ceramic composition, as well as web and honeycomb structure without departing from the spirit of invention.

I claim:

1. A containment ring for turbine engine housings comprising:

(A) an integral honeycomb structure encircling the turbine engine, so as to impede the motion of centrifugally propelled blade fragments;

(B) an intermediate web of subdivided compartments fitted upon the exterior of said honeycomb as a resistance against blade fragment penetration;

(C) a plurality of ceramic blocks confined as independent energy absorbers within said subdivided compartments, so as to blunt and fracture blade fragments, and (D) an outer shielding shell structurally continuous with said intermediate web, so as to confine said ceramic blocks, said outer shell having a bending stiffness adequate to provide support for said ceramic blocks as energy absorbers.

2. A containment ring for turbine engine housings as in claim 1, said web providing a structural link between the engine outer casing and said honeycomb structure.

3. A containment ring for turbine engines as in claim 2, wherein said ceramic blocks are comprised of a hot-pressed composition, including silicon carbide (98%) and boron carbide (2%), having a density between 3.15 and 3.2 g/cm$^3$.

* * * * *